(12) United States Patent
Zheng et al.

(10) Patent No.: US 9,444,834 B2
(45) Date of Patent: Sep. 13, 2016

(54) METHOD AND SYSTEM FOR DETECTING BEHAVIOR OF REMOTELY INTRUDING INTO COMPUTER

(71) Applicant: BEIJING QIHOO TECHNOLOGY COMPANY LIMITED, Xicheng, Beijing (CN)

(72) Inventors: Wenbin Zheng, Beijing (CN); Paul Fan, Beijing (CN); Jianhua Lu, Beijing (CN); Xiaolin Zhang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 1 day.

(21) Appl. No.: 14/377,004

(22) PCT Filed: Feb. 4, 2013

(86) PCT No.: PCT/CN2013/071340
§ 371 (c)(1),
(2) Date: Aug. 6, 2014

(87) PCT Pub. No.: WO2013/117148
PCT Pub. Date: Aug. 15, 2013

(65) Prior Publication Data
US 2015/0207810 A1  Jul. 23, 2015

(30) Foreign Application Priority Data
Feb. 7, 2012  (CN) .......................... 2012 1 0026317

(51) Int. Cl.
*G06F 21/55* (2013.01)
*H04L 29/06* (2006.01)

(52) U.S. Cl.
CPC ......... *H04L 63/1425* (2013.01); *G06F 21/554* (2013.01)

(58) Field of Classification Search
CPC .......................... H04L 63/1425; G06F 21/554
See application file for complete search history.

(56) References Cited

U.S. PATENT DOCUMENTS 4,918,653 A * 4/1990 Johri ....................... G06F 9/468
340/5.74
5,032,979 A * 7/1991 Hecht ................... G06F 21/552
713/164

(Continued)

FOREIGN PATENT DOCUMENTS

CN  101408917 A * 4/2009

OTHER PUBLICATIONS

King, "Backtracking Intrusions," Dept. of Electrical Engineering & Computer Science, University of Michigan, SOSP'03, Oct. 19-22, 2003, ACM, pp. 1-14.*

(Continued)

*Primary Examiner* — Jung Kim
*Assistant Examiner* — James J Wilcox
(74) *Attorney, Agent, or Firm* — James Stipek; John Bednarz; Polsinelli PC

(57) ABSTRACT

The invention discloses a method and system for detecting a behavior of remotely intruding into a computer, wherein the method comprises: monitoring a process creating event in a system; when a request for creating a process is monitored, intercepting the process creating request; by analyzing the process, an ancestor process of the process and a currently opened port, judging whether the process creating operation is normal; and if the process creating request is abnormal, determining the process creating request to be a behavior of remotely intruding into a computer. The invention can detect a remote intrusion behavior without the intervention of a user, and will not cause stored data to expand excessively.

9 Claims, 2 Drawing Sheets

(56) References Cited

U.S. PATENT DOCUMENTS

| | | | |
|---|---|---|---|
| 7,912,866 B2 * | 3/2011 | Borthakur | G06F 17/30067 707/802 |
| 8,661,478 B2 | 2/2014 | Olson | |
| 2005/0108578 A1 * | 5/2005 | Tajalli | G06F 21/566 726/4 |
| 2011/0131617 A1 | 6/2011 | Olson | |

OTHER PUBLICATIONS

Da Teng, (CN101408917 A, Google Patents Translation).*

English translation of Abstract only of Chinese Application No. CN101408917A, Publication Date: Apr. 15, 2009, Country: China, Inventor(s): Canding Yuan et al, Title: Method and System for Detecting Application Program Behavior Legality.

English translation of Abstract only of Chinese Application No. CN101587521B, Publication Date: Dec. 28, 2011, Country: China, Inventor(s): Qiang Guo, Title: Method and Device for Acquiring Remote Computer Information.

English translation of Abstract only of Chinese Application No. CN101176331B, Publication Date: Dec. 28, 2011. Country: China, Inventor(s): Jean-Jacques DeQuevy, Title: Computer Network Intrusion Detection Systema nd Method.

English translation of Abstract only of Japanese Application No. JP2011053893A, Publication Date: Mar. 17, 2011, Country: Japan, Inventor(s): Kito Tetsuo, Title: ILLICIT Process Detection Method and ILLICIT Process Detection System.

International Search Report regarding PCT/CN2013/071340 issued May 16, 2013, 4 pages.

* cited by examiner

METHOD AND SYSTEM FOR DETECTING BEHAVIOR OF REMOTELY INTRUDING INTO COMPUTER

FIELD OF THE INVENTION

The invention relates to the field of computer security technologies, and in particular, to a method and system for detecting a behavior of remotely intruding into a computer.

BACKGROUND OF THE INVENTION

A computer having an IP address may provide various services to other computers in a network by way of opening a port. A port is generally regarded as an export through which a computer communicates with the outside world. For example, an HTTP (Hypertext Transport Protocol) server will open the TCP port 80, and thus, a computer of a user may be connected with the server via the port 80, exchange the HTTP protocol, and obtain an HTTP page ultimately presented on the computer of the user. Or, a mail server may open the port 587, and a computer of a user may be connected with the mail server via the port 587, and exchange the SMTP (Simple Mail Transfer Protocol) protocol, thereby realizing the function of transmitting a mail. Or again, some ports may be further opened in a computer of a user to realize some functions. For example, the computer of the user may open the port 135 by default, so as to be able to be connected with another computer to realize the function of remote assistance, etc.

A common user has no adequate knowledge to manage which ports his own machine needs to open or close, which leaves an opportunity for a hacker to intrude into a computer (which may be the above mentioned HTTP server, mail server, or also may be the computer of the common user). One of commonly used approaches in intrusion is to scan a target machine to seek open ports that may be exploited, and then connect to these ports to manipulate the target machine. For example, an intruder may deliver a spam via the SMTP port 587, or remotely log in a user's machine utilizing the Telnet port 23, and so on.

To keep off the attack of such a remote intrusion behavior, the prior art generally uses the firewall technology to intercept. Firewall technology primarily plays the role of interception by way of adding rules to limit connection. Namely, it may be that a list of IP addresses which can be connected to a certain open port is set by way of a white list, or a list of IP addresses which cannot be connected to a certain open port is set by way of a black list; when a connection request is intercepted by the firewall, it is judged, according to the white list or the black list, whether the IP address of the connection request is an IP address for which connection is allowed, so as to judge whether the connection request this time is a hacker intrusion, and then decide on whether to alarm or prevent this connection.

The firewall technology may play the role of preventing a remote intrusion of a computer to a certain extent, however, at least the following drawbacks exist: the user needs to set a rule, which poses a high professional requirement for the user; if the white list approach is used, the possibility of leading to a misjudgment is relatively large, and with the addition of new IP addresses, the list will be excessively bulky, thereby affecting the response speed of connection; and if the black list approach is used, it is difficult to avoid imperfection, and likewise, an excessive expansion and problems resulting from it exist.

SUMMARY OF THE INVENTION

In view of the above problems, the invention is proposed to provide a method and system for detecting a behavior of remotely intruding into a computer which overcome the above problems or at least in part solve or mitigate the above problems.

According to an aspect of the invention, there is provided a method for detecting a behavior of remotely intruding into a computer comprising: monitoring a process creating event in a system; when a request for creating a process is monitored, intercepting the process creating request; judging whether the process creating operation is normal by analyzing the process, an ancestor process of the process and a currently opened port; and determining the process creating request to be a behavior of remotely intruding into a computer, if the process creating request is abnormal.

According to another aspect of the invention, there is provided a system for detecting a behavior of remotely intruding into a computer comprising: a monitoring unit configured to monitor a process creating event in a system; an intercepting unit configured to, when a request for creating a process is monitored, intercept the process creating request; an analyzing unit configured to judge whether the process creating operation is normal by analyzing the process, an ancestor process of the process and a currently opened port; and a determining unit configured to determine the process creating request to be a behavior of remotely intruding into a computer, if the process creating request is abnormal.

According to still another aspect of the invention, there is provided a computer readable medium comprising instructions stored thereon that, when executed by a computing device causes the computing device to perform the above mentioned operations for detecting behavior of remotely intruding into a computer.

The beneficial effects of the invention lie in that:

In the invention, a process creating request may be intercepted and analyzed, and if an abnormal situation is found, the process creating request may be considered as a hacker intrusion behavior, and then a corresponding measure may be taken to prevent a computer of a user from being infringed. It is thus clear that as long as statistics on the relationships between a process to be created and its ancestor process when individual ports are opened under a normal or abnormal situation are made in advance, it may be judged whether the current process creating request is normal or not, and then it can be avoided that a hacker intrudes via these ports and causes damage to a computer of a user. In this procedure, the intervention of the user is not needed, and although it is also necessary to make statistics of some information, in comparison with a white list or a black list used by the firewall, its order of magnitude is much smaller, so as not to give rise the phenomenon of excessive expansion.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

First, it needs to be noted that, when a hacker intrudes into a target machine remotely, he first needs to connect to the target machine via a currently opened port of the target machine, and then manipulates the target machine to implement a particular operation. These two procedures may be regarded as consisting of two phases: the first phase is to connect, and the second phase is to implement some operations. The idea adopted in the firewall in the prior art when preventing a remote intrusion of a hacker is to cause the hacker to be unable to accomplish the first phase, i.e., unable to connect with the target machine via a port, and in turn, the hacker cannot carry out some subsequent operations, thereby guaranteeing the security of the target machine. However, the inventors has found in the course of implementing the invention that, in the procedure of hacking, what is really threatening the target machine is in fact the second phase, namely, if the hacker cannot implement a subsequent particular operation, then even though the hacker is connected to the target machine via a port, he will not influence the security of the target machine. Therefore, starting from the above idea, embodiments of the invention propose a new method for detecting a behavior of remotely intruding into a computer, thereby achieving the purpose of protecting the security of a target machine.

Figure 1:
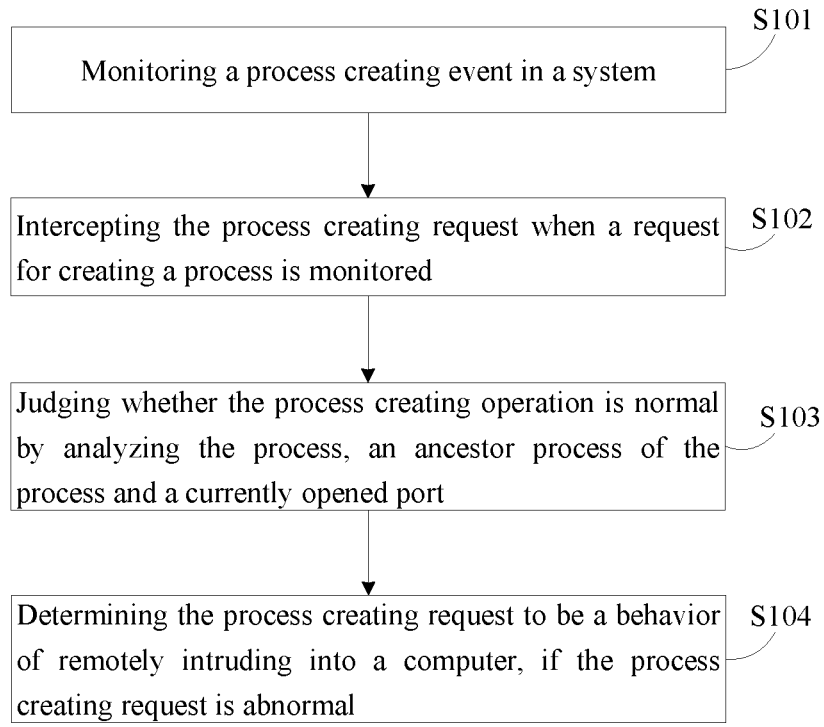
FIG. 1 shows a flow chart of a method for detecting a behavior of remotely intruding into a computer according to an embodiment of the invention.

Referring to FIG. 1, a method for detecting a behavior of remotely intruding into a computer provided by an embodiment of the invention comprises the following steps.

In step S101, monitoring a process creating event in a system.

In the procedure of detecting a behavior of remotely intruding into a computer, the embodiment of the invention does not limit an intrusion behavior of a hacker in the phase of connection, but limits it in the phase of implementing a particular operation. However, in the procedure of implementing a particular operation, it will always be accompanied with the procedure of creating a process, namely, in a computer system, if one wants to implement a certain operation to achieve a certain purpose, he needs to create a corresponding process and complete a corresponding operation in the process. Therefore, it may be judged whether it is intruded by a hacker by checking whether the process creation is normal or not. To this end, a process creating event in the system needs to be monitored.

In S102, when a request for creating a process is monitored, intercepting the process creating request.

In the procedure of monitoring, once it is found a process is to be created, then the creating event is first intercepted. In other words, when it is monitored that a process is to be created, it is not that the creation of the process is directly allowed, but that interception is performed temporarily, and some judgment operations are conducted, which are primarily to discern whether the procedure of creation is normal or not, and if abnormal, it may be an operation conducted in a remote intrusion of a hacker.

In S103, judging whether the process creating operation is normal by analyzing the process, an ancestor process of the process and a currently opened port.

In particular, when analyzing whether a procedure of creating a process is normal, it may be judged by analyzing the process to be created currently and its ancestor process, as well as a currently opened port, etc. Therein, an ancestor process of the process may be learned by querying a process tree. After they run, some program processes will call other processes to implement some particular functions, thus constituting a process tree. The process tree is a pictorial metaphor, for example, a process launches a process, and this launched process is a sub-process of the original process, and so on, and a tree-like structure is thus formed. For example, "cmd" is input in the "run" dialog box of Windows XP to launch the command line console, and then "notepad" is input in the command line to launch a notepad. Now, the command line console process "cmd.exe" and the notepad process "notepad.exe" constitute a process tree, wherein the process "notepad.exe" is created by the process "cmd.exe", the former is called a sub-process, and the latter is called a parent process.

In general, some abnormal phenomena can be found from the relationship between a process to be created currently and its ancestor process. For example, the WMI (Windows Management Instrumentation) should not create an ftp process under normal use, and if the WMI creates an ftp process, it is generally an action of downloading a backdoor by a hacker after intruding via the port 135. In other words, in the case of a certain port being opened, statistics on a process and its ancestor process frequently utilized by a hacker for a remote intrusion may be made in advance. Thus, particularly when it is judged whether a procedure of creating a process, it can be compared with the pre-statistical result. First, it is judged whether a process frequently utilized for a remote intrusion when the port is opened exists in ancestor processes of the said process, and if it does not exist, then the procedure of creating a process may be generally regarded as normal; otherwise, if it exists, then it may be further judged whether the process to be created currently is a process frequently utilized for a remote intrusion when the current port is opened, and if no, the procedure of creating a process may be regarded as normal, and otherwise, if yes, the current procedure of creating a process may be determined to be generated by a remote intrusion behavior of a hacker.

Of course, in a practical application, in the case of a certain port being opened, it may be that not all the processes will be used by a hacker for a remote intrusion, and only some particular processes will be utilized by the hacker. Therefore, when process creation is monitored particularly, it may also be that interception is conducted only when a request for creating some particular processes is monitored, and it is further checked whether the process creating operation is normal or not. For example, if the system generates a new request for creating an ftp process, it may be checked whether the WMI is among the ancestor process of the ftp, and the port 135 is in the open state, if yes, then the request for creating an ftp process may be regarded as abnormal and might be a behavior of a hacker's remote intrusion.

In addition, in a particular implementation, for some special situations, if only judging the relationship between a process to be created currently and its ancestor process to judge whether the current process creating request is normal or not, a situation of misjudgment may appear. For example, that Sqlserver creates a cmd process may be a normal operation, but it may also be a danger signal of being intruded, and for now a determination cannot be made using the forgoing method directly. However, by judging the command line parameter sent to cmd by sqlserver, it may be determined that this is a normal creation, or an abnormal creation. For example, if sqlserver creates a cmd process and the command line parameter is "wmic cpu get processrid", then this is a normal situation. However, if sqlserver creates a cmd process and the command line parameter is "ftp ip address\trojan.exe", then this is an abnormal situation. That is to say, after judging that a process or its ancestor process is a process frequently used for a remote intrusion, further judging the command line parameter in the process to further determine whether the current process creating request is normal, and thereby further judge whether a behavior of remotely intruding into a computer exists at present.

Therein, the command line parameter is one of operating parameters of a process, and in a practical application, the command line parameter is just an example. In addition to this, other operating parameters in a process relationship may further be obtained as materials for reference, e.g., the version number of a program corresponding to an ancestor process (for a process to be created currently and its ancestor process, they may be normal in programs of some versions, but may be abnormal in other versions), the installation path in the procedure of creating a process (e.g., when a cmd process is created, the normal installation path is usually under the system disk, and if it is other path than the system disk, then it may be abnormal), and the command line parameter of an ancestor process (sqlserver), etc., to assist in the judgment.

In a particular implementation, to avoid excessively occupying local computer resources of a user, common process operating parameters may be gathered and saved in a cloud background, and constantly updated and adjusted; after gathering operating parameters of a process, a client uploads them to the cloud background and the particular work of check and judgment is performed in the cloud background to reduce false alarms.

It needs to be noted that, in a particular implementation, judging whether the current process creating request is normal or not according to various operating parameters of the process alone, or, first judging whether the various operating parameters are normal or not, and if abnormal, then further judging whether the process or its ancestor process is a process frequently used for a remote intrusion, thereby comprehensively determining whether the current process creating request is normal, which are all feasible and will not be described in detail here.

In S104, if the process creating request is abnormal, determining the process creating request to be a behavior of remotely intruding into a computer.

If it is found an abnormal situation exists for the process creating request, then the current process creating request is determined to be a remote intrusion behavior. Further, it may be possible to directly prevent the creating operation of the current process, or to further avoid a misjudgment, it may be that an alarm is first sent to the user, the user further judges whether the current process creating request is normal or not, and if the user selects to prevent it, then prevents the creating operation of the current process, otherwise, if the user selects to allow it, then allows the process creating operation to be performed, namely, releases the intercepted request and allows it to continue. Of course, if it is found that the process creating request is normal, it may equally be released to conduct a normal process creation.

In summary, in the embodiment of the invention, a process creating request is intercepted and analyzed, and if an abnormal situation is found, the process creating request may be considered as a hacker intrusion behavior, and then a corresponding measure may be taken to prevent a computer of a user from being infringed. It is thus clear that as long as statistics on the relationships between a process to be created and its ancestor process when individual ports are opened under a normal or abnormal situation are made in advance, it may be judged whether the current process creating request is normal or not, and then it can be avoided that a hacker intrudes via these ports and causes damage to a computer of a user. In this procedure, the intervention of the user is not needed, and although it is also necessary to make statistics of some information, in comparison with a white list or a black list used by the firewall, its order of magnitude is much smaller, so as not to give rise the phenomenon of excessive expansion.

Figure 2:
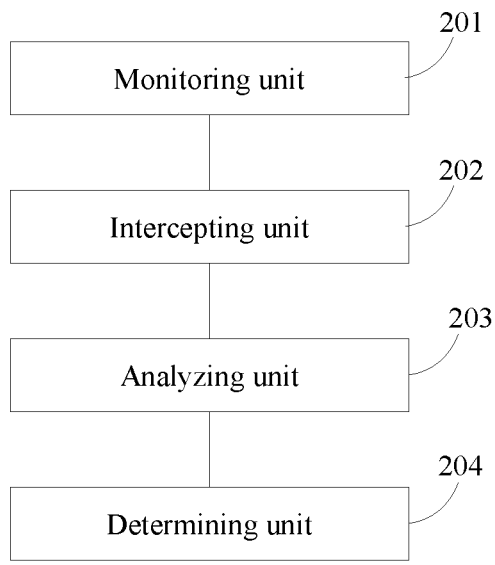
FIG. 2 shows a schematic diagram of a system for detecting a behavior of remotely intruding into a computer according to an embodiment of the invention.

Correspondingly to the method for detecting a behavior of remotely intruding into a computer provided by the embodiment of the invention, an embodiment of the invention further provides a system for detecting a behavior of remotely intruding into a computer, referring to FIG. 2, which system comprises:

a monitoring unit 201 configured to monitor a process creating event in a system;

an intercepting unit 202 configured to, when a request for creating a process is monitored, intercept the process creating request;

an analyzing unit 203 configured to judge whether the process creating operation is normal by analyzing the process, an ancestor process of the process and a currently opened port; and a determining unit 204 configured to determine the process creating request to be a behavior of remotely intruding into a computer, if the process creating request is abnormal.

Therein, if the process creating operation is abnormal, then the system further comprises:

a first processing unit configured to prevent the implementation of the process creating operation; or a second processing unit configured to send an abnormality alarm, and prevent or allow the implementation of the process creating operation according to the user's selection operation.

If the process creating request is normal, then the system further comprises:

a third processing unit configured to allow the implementation of the creating operation.

In a particular implementation, the analyzing unit 203 may particularly comprise:

a first judging subunit configured to judge whether a process frequently utilized for a remote intrusion when the port is opened exists in ancestor processes of the said process;

a second judging subunit configured to judge whether the process is a process frequently utilized for a remote intrusion when the port is opened, if the judgment result of the first judging subunit is yes; and a determining subunit configured to determine the process creating request to be abnormal, if the judgment result of the second judging subunit is yes.

To reduce the possibility of misjudgment, the analyzing unit 203 may further comprise:

a third judging subunit configured to judge whether the operating parameters of the process and/or of its ancestor process are normal, and if abnormal, the determining subunit determines the process creating request to be abnormal.

In summary, in the system provided by the embodiment of the invention, a process creating request is intercepted and analyzed, and if an abnormal situation is found, the process creating request may be considered as a hacker intrusion behavior, and then a corresponding measure may be taken to prevent a computer of a user from being infringed. It is thus clear that as long as statistics on the relationships between a process to be created and its ancestor process when individual ports are opened under a normal or abnormal situation are made in advance, it may be judged whether the current process creating request is normal or not, and then it can be avoided that a hacker intrudes via these ports and causes damage to a computer of a user. In this procedure, the intervention of the user is not needed, and although it is also necessary to make statistics of some information, in comparison with a white list or a black list used by the firewall, its order of magnitude is much smaller, so as not to give rise the phenomenon of excessive expansion.

It can be seen from the description of the above embodiments that, the skilled in the art may clearly learn that the invention may be implemented by way of software plus a necessary general-purpose hardware platform. Based on such an understanding, the technical solutions of the invention, substantially or for the part contributing to the prior art, may be embodied in the form of a software product, and the computer software product may be stored in a storage medium, such as ROM/RAM, a magnetic disk, a compact disc, etc., and comprises several instructions for causing a computer device (which may be a personal computer, a server, or a network device, etc.) to perform methods described in various embodiments or certain parts of the embodiments of the invention.

Various embodiments in this specification are all described using a progressive manner, identical or similar parts of various embodiments may be referred relative to each other, and each embodiment highlights its difference from other embodiments. Especially, for an embodiment of an apparatus or system, it is described relatively simply due to it being substantially similar to a corresponding method embodiment, and as for its relevant parts reference may be made to the parts of the method embodiment. The embodiments of the apparatus or system described above are just schematic, wherein units illustrated as separate components may be or also may not be physically separated; and components shown as units may be or also may not be physical units, namely, may be located at one place, or also may be distributed across a plurality of network units. Part or all of the modules therein may be selected according to an actual need to achieve the object of the schemes of the embodiments. They can be understood and effected by those of ordinary skills in the art without paying out creative work.

Embodiments of the individual components of the invention may be implemented in hardware, or in a software module running on one or more processors, or in a combination thereof. It will be appreciated by those skilled in the art that, in practice, some or all of the functions of some or all of the components in a system for detecting a behavior of remotely intruding into a computer according to embodiments of the invention may be realized using a microprocessor or a digital signal processor (DSP). The invention may also be implemented as a device or an apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 3:
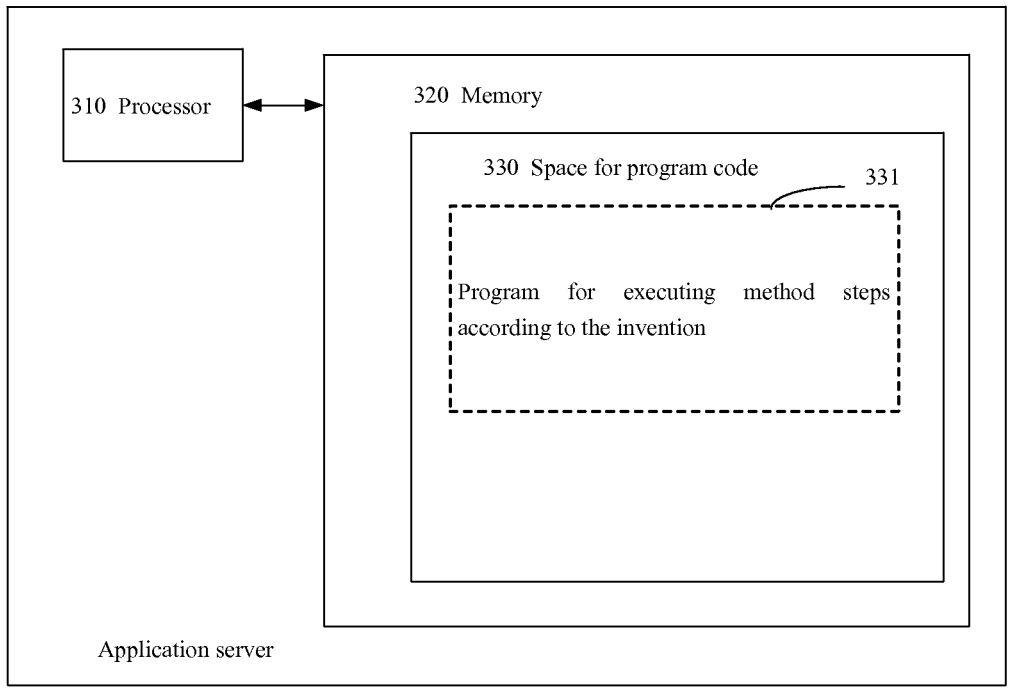
FIG. 3 shows schematically a block diagram of a server for performing a method according to the invention.
Figure 4:
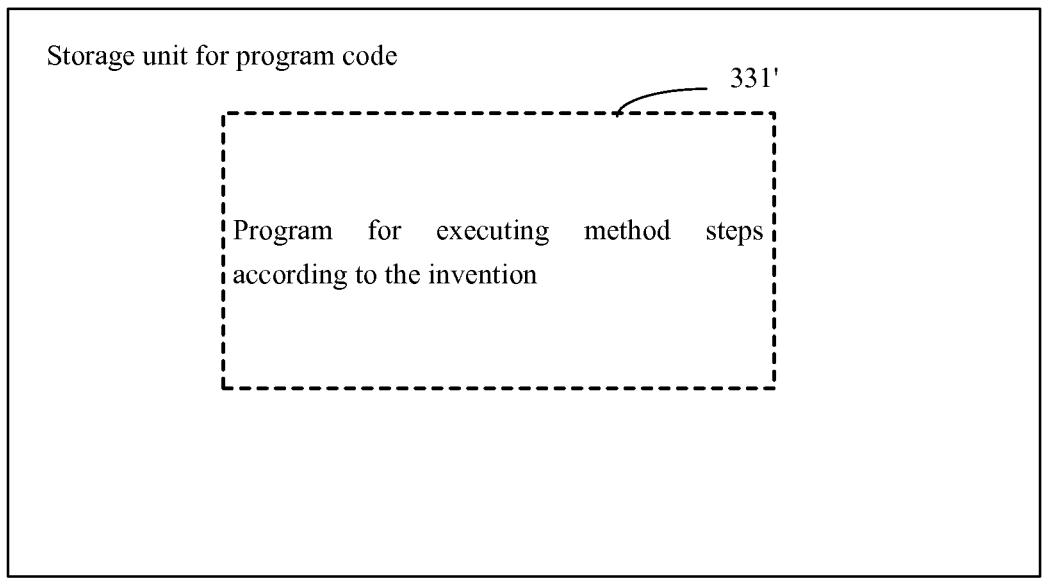
FIG. 4 shows schematically a storage unit for retaining or carrying a program code implementing a method according to the invention.

For example, FIG. 3 shows a server which may carry out a method for detecting a behavior of remotely intruding into a computer according to the invention, e.g., an application server. The server traditionally comprises a processor 310 and a computer program product or a computer readable medium in the form of a memory 320. The memory 320 may be an electronic memory such as a flash memory, an EEPROM (electrically erasable programmable read-only memory), an EPROM, a hard disk or a ROM. The memory 320 has a memory space 330 for a program code 331 for carrying out any method steps in the methods as described above. For example, the memory space 330 for a program code may comprise individual program codes 331 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 4. The storage unit may have a memory segment, a memory space, etc. arranged similarly to the memory 320 in the server of FIG. 3. The program code may for example be compressed in an appropriate form. In general, the storage unit comprises a computer readable code 331', i.e., a code which may be read by e.g., a processor such as 310, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for detecting behavior of remotely intruding into a computer comprising:

monitoring, by at least one processor, a process creating event in a system;

when a request for creating a process is monitored, intercepting, by the at least one processor, the process creating request;

determining, by the at least one processor, whether the process creating request is normal by analyzing the process, an ancestor process of the process, and a currently opened port, the determining whether the process creating request is normal comprising determining whether a process frequently utilized for a remote intrusion when the port is opened exists in the ancestor process of the process, determining whether the process is a process frequently utilized for a remote intrusion when the port is opened, and determining the process creating request to be abnormal when the process frequently utilized for the remote intrusion when the port is opened exists in the ancestor process of the process and when the process is frequently utilized for the remote intrusion when the port is opened; and determining, by the at least one processor, the process creating request to be a behavior of remotely intruding into the computer, if the process creating request is abnormal.

2. The method according to claim 1, wherein if the process creating request is abnormal, the method further comprising:

preventing implementation of the process creating request; or sending an abnormality alarm, and preventing or allowing the implementation of the process creating request according to a user's selection operation.

3. The method according to claim 1, wherein if the process creating request is normal, the method further comprising:

allowing implementation of the process creating request.

4. The method according to claim 1, wherein before determining the process creating request to be abnormal, further comprising:

determining whether operating parameters of the process and/or of the ancestor process are normal, and if abnormal, determining the process creating request to be abnormal.

5. A system for detecting a behavior of remotely intruding into a computer comprising:

a memory having instructions stored thereon; and a processor to execute the instructions to perform operations for detecting a behavior of remotely intruding into the computer, the operations comprising:

monitoring a process creating event in a system;

when a request for creating a process is monitored, intercepting the process creating request;

determining whether the process creating request is normal by analyzing the process, an ancestor process of the process, and a currently opened port, the determining whether the process creating request is normal comprising determining whether a process frequently utilized for a remote intrusion when the port is opened exists in the ancestor process of the process, determining whether the process is a process frequently utilized for a remote intrusion when the port is opened, and determining the process creating request to be abnormal when the process frequently utilized for remote intrusion when the port is open exists in the ancestor process of the process and when the process is frequently utilized for the remote intrusion when the port is opened; and determining the process creating request to be a behavior of remotely intruding into the computer, if the process creating request is abnormal.

6. The system according to claim 5, wherein if the process creating operation is abnormal, then the operations further comprising:

preventing implementation of the process creating request; or sending an abnormality alarm, and preventing or allowing the implementation of the process creating request according to a user's selection operation.

7. The system according to claim 5, wherein if the process creating request is normal, then the operations further comprising:

allowing implementation of the process creating request.

8. The system according to claim 5, wherein the operations further comprising:

determining whether operating parameters of the process and/or of the ancestor process are normal, and if abnormal, determining the process creating request to be abnormal.

9. A non-transitory computer readable medium comprising instructions stored thereon that, when executed by a computing device causes the computing device to perform operations for detecting behavior of remotely intruding into a computer, the operations comprising monitoring a process creating event in a system;

when a request for creating a process is monitored, intercepting the process creating request;

determining whether the process creating request is normal by analyzing the process, an ancestor process of the process, and a currently opened port, the determining whether the process creating request is normal comprising determining whether a process frequently utilized for a remote intrusion when the port is opened exists in the ancestor process of the process, determining whether the process is a process frequently utilized for a remote intrusion when the port is opened, and determining the process creating request to be abnormal when the process frequently utilized for the remote intrusion when the port is opened exists in the ancestor process of the process and when the process is frequently utilized for the remote intrusion when the port is opened; and determining the process creating request to be a behavior of remotely intruding into a computer, if the process creating request is abnormal.

* * * * *